(12) United States Patent
Lamoureux (10) Patent No.: US 10,493,895 B2
(45) Date of Patent: Dec. 3, 2019

(54) DEVICE FOR ATTACHMENT TO A RAIL (71) Applicant: A. RAYMOND ET CIE, Grenoble (FR)

(72) Inventor: David Lamoureux, Grenoble (FR)

(73) Assignee: A. RAYMOND ET CIE, Grenoble (FR)

( * ) Notice: Subject to any disclaimer, the term of this patent is extended or adjusted under 35 U.S.C. 154(b) by 523 days.

(21) Appl. No.: 15/129,283

(22) PCT Filed: Nov. 12, 2014

(86) PCT No.: PCT/FR2014/000239
§ 371 (c)(1),
(2) Date: Feb. 7, 2017

(87) PCT Pub. No.: WO2015/144996
PCT Pub. Date: Oct. 1, 2015

(65) Prior Publication Data
US 2017/0136936 A1  May 18, 2017

(30) Foreign Application Priority Data

Mar. 27, 2014 (FR) ..................... 14 52639

(51) Int. Cl.
*B60P 7/08* (2006.01)
*F16B 21/02* (2006.01)
(52) U.S. Cl.
CPC ............ *B60P 7/0815* (2013.01); *F16B 21/02* (2013.01)
(58) Field of Classification Search
CPC ......... B60P 7/08; B60P 7/0823; B60P 7/0815; F16B 21/02; F16B 7/187; F16B 37/045;
(Continued)

(56) References Cited

U.S. PATENT DOCUMENTS 5,489,173 A * 2/1996 Hofle ................... F16B 37/045
411/104
7,101,131 B2 * 9/2006 Herb ..................... F16B 37/045
411/84
(Continued)

FOREIGN PATENT DOCUMENTS

| EP | 1932719 A1 | 6/2008 |
|---|---|---|
| EP | 2028043 A1 | 2/2009 |
| FR | 2675442 A1 | 10/1992 |

OTHER PUBLICATIONS

"Indicator Lock, Toilet Lock, Turning Lock." WeiKu: Integrating Global Trade Leads, Weiku.com, Sep. 8, 2012, www.weiku.com/products/7271611/indicator_lock_toilet_lock_turning_lock.html. Accessed: Feb. 13, 2019 (Year: 2012).*

*Primary Examiner* — Jonathan P Masinick
(74) *Attorney, Agent, or Firm* — Dickinson Wright PLLC (57) ABSTRACT

An attachment device for attaching to a generally channel-section rail having rims forming a channel is provided. The device comprises a latch for inserting into the inside of the channel and for being retained therein by the rims of the rail, and a locking member for locking the latch in the rail. The locking member comprises a rotary shaft secured to the latch and extending axially through a bearing plats for resting on the top of the channel. The locking member also includes a cam adapted to move the bearing plate axially relative to the rotary shaft when the rotary shaft is turned in one direction or the other. The bearing plate comes closer to the latch when the rotary shaft is turned in one direction of rotation and the bearing plate moves away from the latch when the rotary shaft is burned in the opposite direction.

10 Claims, 5 Drawing Sheets

(58) Field of Classification Search
CPC ...... F16B 37/0807; F16B 37/042; F16B 2/18; Y10T 403/7067; Y10T 403/7069; Y10T 403/20; Y10T 403/4674; Y10T 403/4677; Y10T 403/4682; Y10T 403/4685; Y10T 403/4688; Y10T 403/589; Y10T 403/7015; Y10T 403/7094; A61G 3/00; A61G 3/0825; A61G 3/0833
USPC ......... 403/27, 256, 257, 259, 260, 261, 320, 403/353, 381
See application file for complete search history.

(56) References Cited

U.S. PATENT DOCUMENTS

| | | | | |
|---|---|---|---|---|
| 7,401,995 | B2* | 7/2008 | Senakiewich, II | B60P 7/0815 403/374.4 |
| 7,497,651 | B2* | 3/2009 | Harberts | B60P 7/0815 410/101 |
| 7,874,774 | B2* | 1/2011 | Peterson | B60P 7/0815 410/104 |
| 7,976,256 | B2* | 7/2011 | Womack | B60P 7/0815 410/104 |
| 2010/0219309 | A1* | 9/2010 | Hermann | F16B 37/045 248/222.11 |
| 2011/0315731 | A1* | 12/2011 | Takemura | B60P 7/0815 224/567 |

* cited by examiner

DEVICE FOR ATTACHMENT TO A RAIL

CROSS REFERENCE TO RELATED APPLICATIONS

This U.S. patent application is a 371 national phase entry of PCT/FR2014/000239, filed 12 Nov. 2014, which claims benefit of French Patent Application No. 1452639, filed Mar. 27, 2014, the entire contents of which are incorporated herein by reference.

BACKGROUND

1. Technical Field

The present invention relates to an attachment device for attaching along a rail to enable loads or straps to be stowed.

The present invention relates more particularly to an attachment device for attaching to a generally channel-section rail having rims ferrying a channel. The device comprises a latch for inserting into the inside of the channel and for being retained therein by the rims of the rail. The device further comprises a locking member for locking the latch in the rail, which member comprises a rotary shaft scoured to the latch and extending axially through a bearing plate for resting on the top of the channel.

2. Related Art

Such devices are used in particular in airplane holds or in the trailers of transport vehicles. By way of example, the rails are arranged along the walls of the vehicle and the attachment devices are placed on the rails in each a manner as to enable straps to be stowed; e.g. for the purpose of stabilizing a load in the vehicle.

Devices of this type are described in particular in Document FR 2 675 442, for example. That document shows a device for stowing loads using a support, rail, which device can be put into place manually by inserting a locking system, turning it, and presenting it from moving. This system comprises an anvil screw having a rectangular head of width that is smaller than the width of the rail. On insertion into the rail, the anvil screw is thus oriented parallel to the rail. Turning the screw through a quarter-turn, then causes the head of the screw to move under the rims or the rail. Thereafter, a lever arm serves to press the anvil screw against the undersides of the rims of the rail.

Nevertheless, such a device presents several drawbacks. Specifically, the lever arm effect does not make it possible to gauge correctly the force needed for lifting the anvil screw and clamping it. For example, the clamping device may break, if the lever is pushed down too far or it may be clamped insufficiently if the lever is not shushed down far enough.

Furthermore, while the anvil screw is being turned, the clamping device may also move along the rail until the lever is lowered. It is thus possible to clamp the device in the wrong place along the rail.

Finally, it is also possible to fail to turn the anvil screw sufficiently and to lower the lever while the anvil screw is not in its clamping position. Under such circumstances, the device rosy be insecurely attached and may become detached, when a heavy load is applied thereto.

That device is therefore not suitable for use in locking to a rail in a manner that is simple, fast, and reliable.

SUMMARY

The object of the invention is thus to propose an attachment device for attaching to a rail that does not present the above-mentioned drawbacks.

To this end, the invention provides an attachment device for attaching to a generally channel-section rail having rims forming a channel, the attachment device comprising a latch for inserting into the inside of the channel and for being retained therein by the rims of the rail, and a locking member for locking the latch in the rail, which member comprises a rotary shaft secured to the latch and extending axially through a bearing plate for resting on the top of the channel, the attachment device being characterized in that the locking member comprises a cam adapted to move the bearing plate axially relative co the rotary chart when the rotary shaft is turned in one direction or the other, the bearing plate coming closer to the latch when, the rotary shaft is turned in one direction of rotation and the bearing plate moving away from the latch when the rotary shaft is turned in the opposite direction.

The idea on which the invention is based is thus to use a cam for transforming the turning movement of the rotary shaft into movement in translation of the bearing plate along the shaft so as to optimize clamping of the rims of the rail between the latch and the bearing plate.

Such a cam provides a better clamping sensation and thus makes it possible to avoid the device being broken while it is being clamped. Furthermore, the cam of the invention avoids clamping taking place in involuntary manner, as can easily happen with a lever arm for lowering.

According to a feature of the attachment device of the invention, the latch may be of elongate shape and may be constrained to turn with the shaft so as to present an insert ion position in which the latch extends along the rail, and an attachment position in which the latch extends transversely relative to the rail by being clamped against the rims of the rail.

According to yet another feature of the attachment device of the invention, there are provided both a guide slide arranged under the bearing plate, the slide being designed to be inserted inside the channel, and also at least one indexing stud that extends perpendicularly from the bearing plate in the slide, and the cam is arranged in such a manner that when the shaft is turned in the first direction of rotation, the indexing stud projects from the slide, and when the shaft is turned in the opposite direction of rotation, the indexing stud is retracted into the inside of the slide.

With this arrangement of the attachment device of the invention, it is possible in synchronous manner to cause the latch to pivot into the attachment position, to move the bearing plate towards the latch perpendicularly to the rail, and to insert the indexing stud into the bottom of the rail. In all, a single turning movement of the shaft, e.g. through one-quarter of a turn, suffices to attach the attachment device in the rail, to clamp it, and to prevent it from moving in translation.

Such an arrangement thus enables the attachment device to be used in a manner that is simple, quick, and reliable.

The attachment device of the invention may present the following features:

- the cam is made up of a first cam portion secured to the rotary shaft and a second cam portion secured to the bearing plate in which the rotary shaft can turn freely, the first cam portion being superposed on the second cam portion via a helical contact surface;
- the rail has a bottom defining indexing lobes in which the indexing stud becomes inserted;
- it comprises a handle mounted at one end of the rotary shaft and the handle may be surmounted by an attachment ring;

the cam may comprise blocking means for blocking movement of the first cam portion in rotation relative to the second cam portion at the end of the locking and/or unlocking stroke;

the bearing plate may comprise two flexible strips that enable the rail to be put under stress in controlled manner and that may act as anti-vibration slack take-up means;

it may comprise a state indicator that indicates a state of the attachment device in its fully locked position and a state of the attachment device in its fully unlocked position; and said state indicator may be constituted by two different visible marks arranged on the bearing plate and angularly spaced apart from each other on a circularly arcuate path of a window formed in the handle.

Other characteristics, advantages, and details of the present invention appear on reading the following description of an embodiment of the invention given by way of non-limiting illustration, this description being made with reference to the accompanying drawings.

DETAILED DESCRIPTION OF EXAMPLE EMBODIMENTS

FIGS. 1 to 5c show an embodiment of an attachment device 1 of the invention for attaching to a section member rail.

Figure 1:
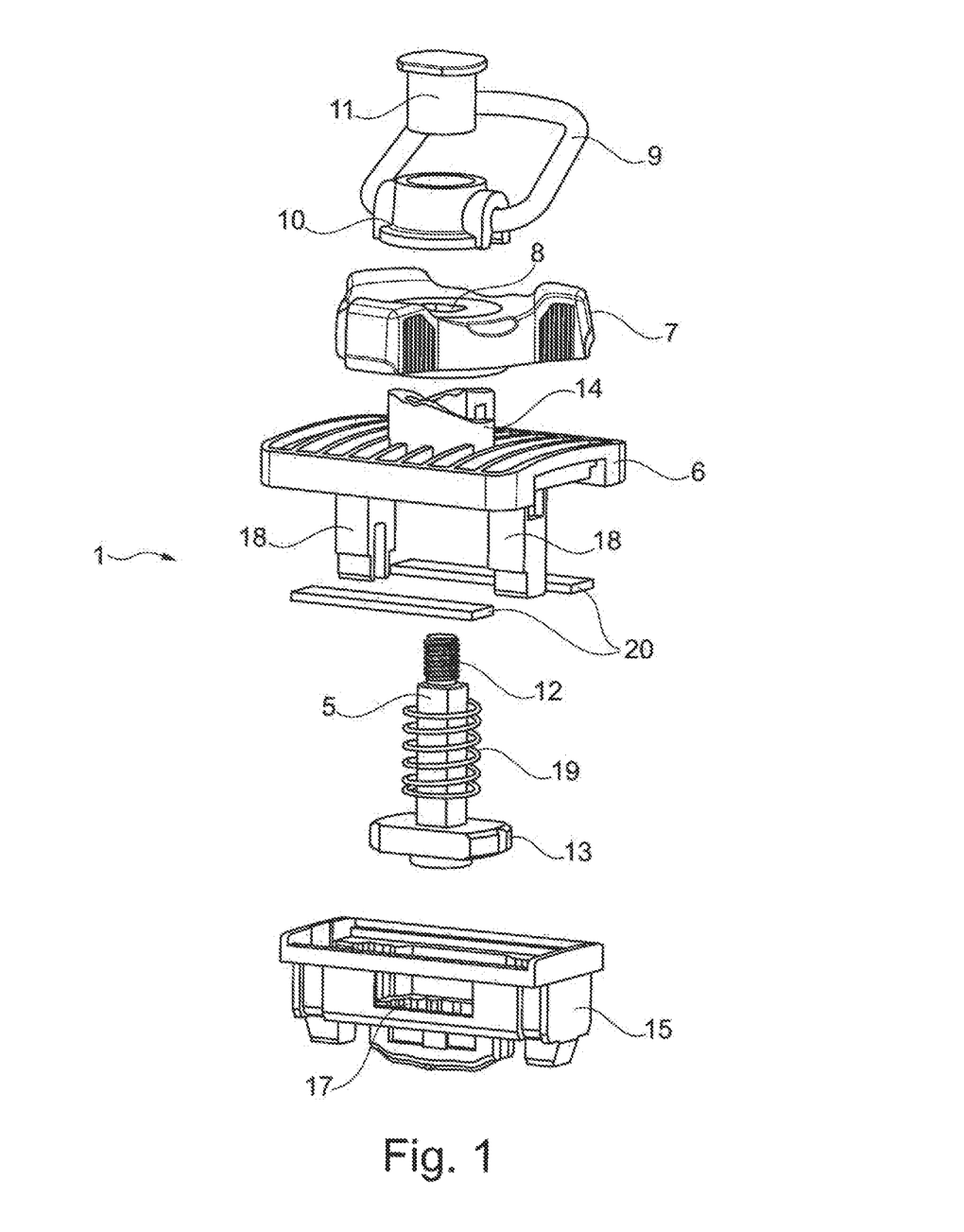
FIG. 1 is a diagrammatic exploded view in perspective of an attachment device of the invention.
Figure 2:
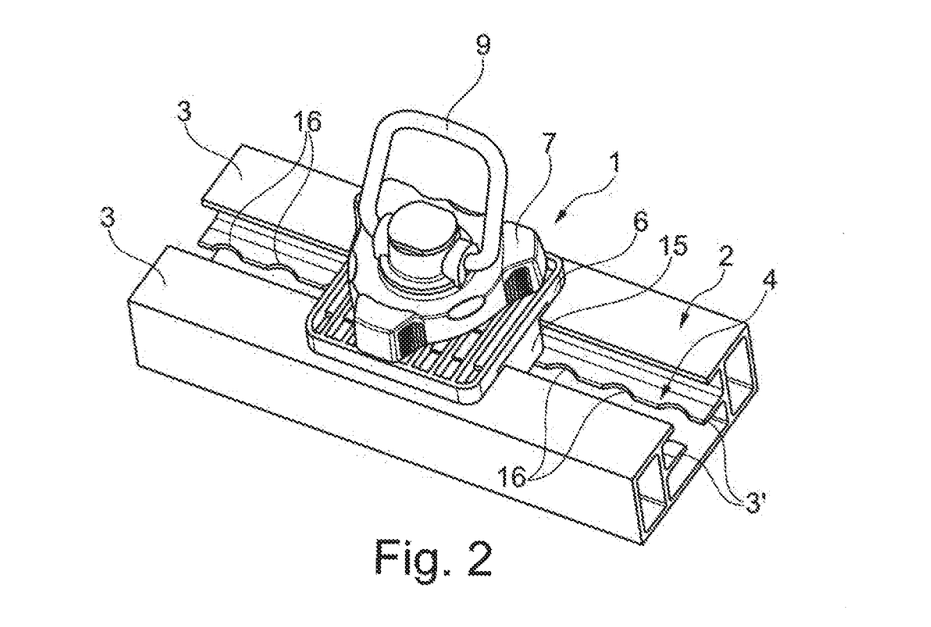
FIG. 2 is a diagrammatic perspective view of the FIG. 1 attachment device mounted in a rail.

FIG. 1 is an exploded view showing the component elements of an attachment device 1, and FIG. 2 shows the attachment device 1 inserted in a section member rail 2, e.g. an aluminum rail, which rail is generally of channel-section with side rims 3 forcing between them a channel 4.

The attachment device 1 of the invention may be inserted in the rail 2 and attached thereto at any location along the rail. The attachment device 1 may also be removed from the rail or even, after it has been attached, it may be reused at another location of the rail without it being necessary to extract it from the rail for that purpose.

In FIG. 1, the attachment device 1 has a rotary shaft 5 that passes through a bearing plate 6, which may for example be made of molded plastics material, for the purpose of resting against the top of the channel 4, i.e. above the rims 3 of the rail.

The attachment device 1 has a locking and unlocking handle 7 that can be turned above the bearing plate 6 and that is constrained to move in rotation with one end of the shaft 5. By way of example, the handle may have a central hole 3 of square section, as can be seen in FIG. 1, with an end portion of complementary square section of the shaft 5 passing therethrough.

The looking handle in this example is a handle of substantially triangular shape, each, corner of the triangle presenting two opposite grip faces of the handle, thus enabling the shaft 5 to be turned in one direction or the other in order to lock or unlock the attachment device 1 in the rail 2.

The attachment device 1 further comprises an attachment ring 9 that is used as means for stowing loads. The ring 9 is mounted above the locking handle 7 with the help of a ring support 10 having a nut 11 that is screwed onto the threaded free end 12 of the shaft 5. The attachment ring 9 is pivotally mounted in the support 10.

The attachment device 1 also has a latch plate 13 or catch through which the rotary shaft 5 passes.

The latch plate 13 is elongate in shape, and in this example if is mainly rectangular, the width of the latch being less that the width of the channel between the rims 3 and the length of the latch being greater than the width of the channel.

As shown in FIG. 1, the latch 13 is constrained to turn with the shaft 5, as is the handle 7.

According to the invention, the attachment device 1 comprises a locking cam 14 arranged between, the locking handle 7 and the bearing plate 6.

The locking cam 14 transforms rotary movement of the handle into movement in axial translation of the bearing plate 6 along the shaft 5. More particularly, when the handle is turned in a direction corresponding to the direction for locking the attachment device 1 in the rail 2, the cam 14 acts to move the bearing plate closer to the latch in the axial direction, and when the handle its turned in the opposite direction, corresponding to the direction for unlocking the attachment device 1 in the rail 2, the cam acts to move the bearing plate away from the latch.

Figures 5A, 5B, 5C:
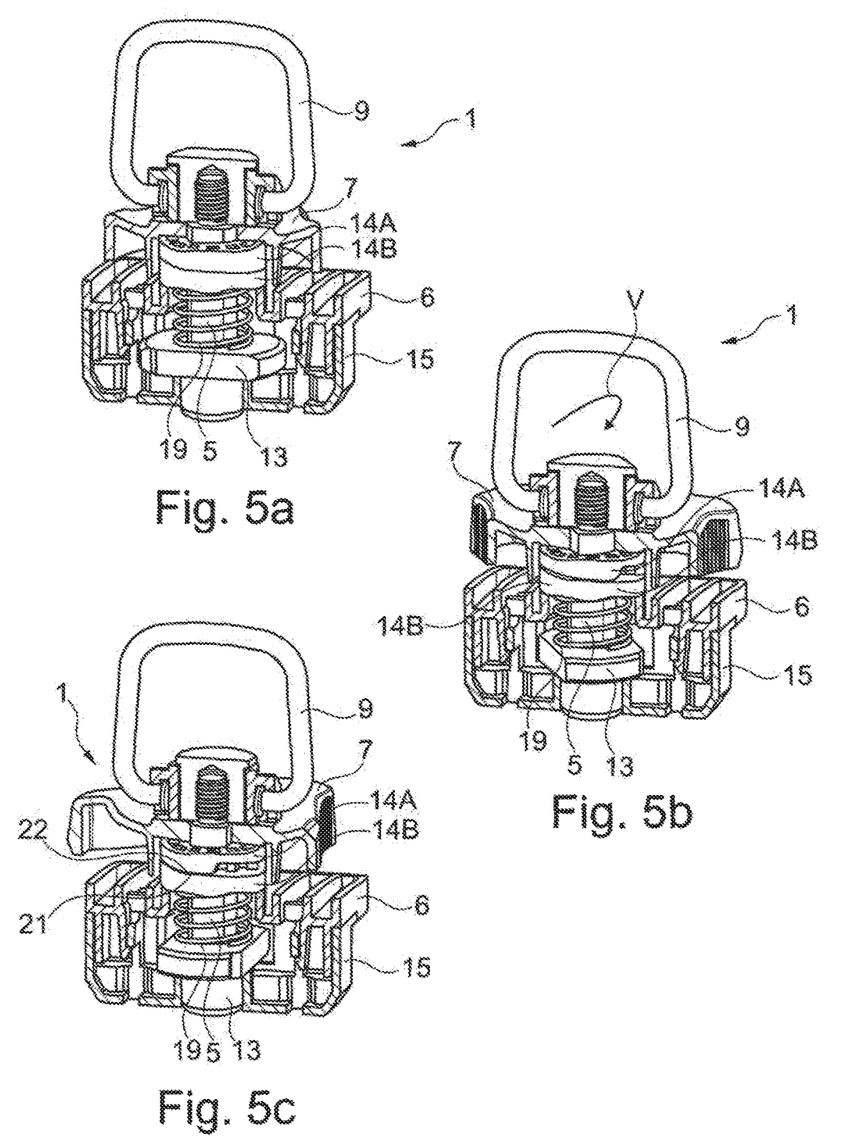
FIGS. 5a to 5c are section views in perspective showing the attachment device of the invention in various locking and unlocking positions.

The cam 14 is formed by two superposed disks having a helical contact surface. FIGS. 5a to 5c are axial section views showing the two disks 14A and 14B of the cam 14. The top disk 14A is mounted in the locking handle 7 and is constrained to turn with the shaft 5, while the bottom disk 14B is mounted on top of the bearing plate 6, the shaft 5 turning freely in the bottom disk 14B.

The helical surface of the cam portion 14A forms a bearing ramp for the helical surface of the cam surface 14B, this ramp generating movement of the bearing plate in axial translation along the shaft 5, as explained below.

In this example, the attachment device 1 of the invention also includes a slide 15 acting as a guide that becomes engaged under the bearing plate 6. The slide 15 is designed to be inserted in the channel of the rail. It is designed to extend in the proximity of the bottom of the rail, which bottom in this example presents two internal side rims 3' defining an alignment of load-shaped indentations along the rail in the form of indexing lobes 16.

The slide 15 is hollow in order to receive the latch 13, which in this example is constrained to turn with the shaft 5. In the locking position of the attachment device 1, the latch 13 projects through lateral slots 17 in the slide 15.

According to the invention, the attachment device 1 may advantageously present one or more indexing pegs or studs 18, there being two studs 18 in this example, that are in alignment along the axis or the guide rail, which studs are formed on the underside of the bearing plate and pass through the slide 15, extending perpendicularly to the bottom of the rail and to the bearing plate and being received in the indexing lobes 16 when the attachment device 1 is in the locked position. These indexing studs 18 serve to prevent the attachment device from moving in translation along the rail when it is in a locked state.

In this example, the indexing studs 18 are mounted to slide in the slide 15 so that when the handle 7 is turned in the locking direction, the indexing studs 18 project from the slide towards the bottom of the rail under drive from the cam 14, and when the handle 7 is turned in the opposite direction (the unlocking direction), the indexing studs 18 retract into the inside of the slide 15 under drive from the cam 14.

For this purpose, it is possible to provide an arrangement whereby the slide 15 becomes wedged in the bottom of the rail while the bearing plate is movably mounted relative to the slide along the axis of the shaft 5. The indexing studs 18, which may be integrally molded with the bearing plate 6, are constrained to move axially in translation with the bearing plate.

A return spring 19, in this example a spiral spring, is mounted around the shaft 5 between the latch and the bottom disk 14B of the cam in order to urge the bearing plate 6 away from the latch 13 when the handle 7 is turned in the unlocking direction.

Figure 3:
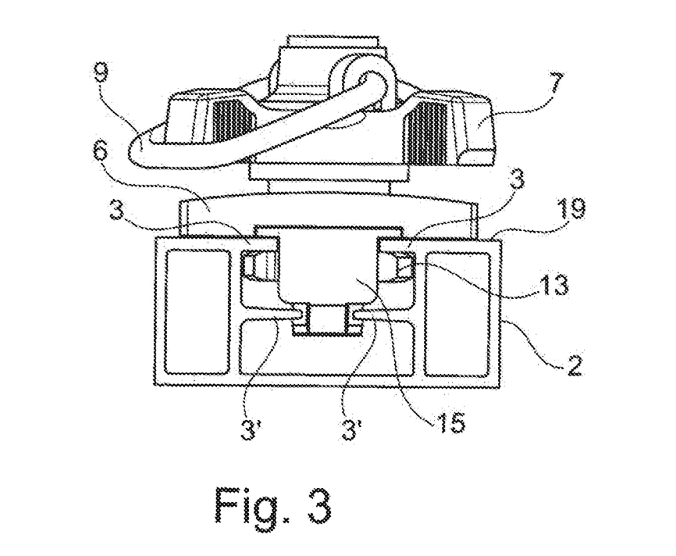
FIG. 3 is a diagrammatic section view of the attachment device of the invention as show in FIG. 2.

The attachment device 1 of the invention may also comprise two flexible strips 20, e.g. made of elastomer, co-operating with the bearing plate to form a single part obtained by "bi-injection", the strip being arranged on either side of the hearing plate 6 so as to come into contact with respective ones of the rims 3 of the rail, as shown in FIG. 3. The two flexible strips 20 could equally well be fitted onto the two sides of the bearing plate, e.g. by means of adhesive.

These flexible strips 20 serve to obtain good compression of the rail over an extended bearing surface and they enable slack to be taken up so as to reduce vibration of the attachment device 1 on the rail.

Figure 4A:
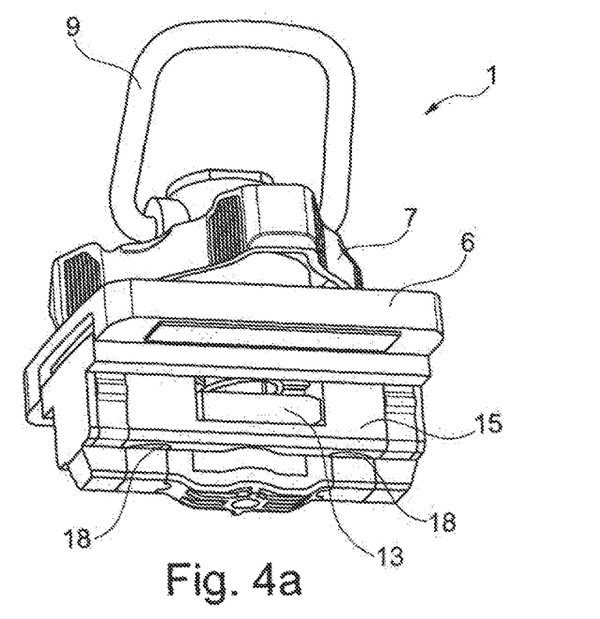
FIGS. 4a and 4b are diagrammatic perspective views showing different locking and unlocking states of the attachment device of the invention.

In order to position the attachment device 1 of the invention in the rail it is necessary to present the latch 13 in axial alignment in the slide 15, as shown in FIGS. 4a and 5a. In these figures, it can be seen that the indexing studs 18 are retracted into the slide 15.

The slide 15 together with the latch 13 is inserted into the rail 2. The bearing plate 6 is then located above, the top faces of the rims 3 of the rail. The anti-vibration slack take-up strips are interposed between the bearing plate 6 and the rims 3 of the rail.

In FIG. 5b, the handle 7 has been turned in the locking direction represented by arrow V, thereby causing the cam portion 14A to turn relative to the cam portion 14B which constitutes a ramp, and as a result, the bearing plate 6 is moved towards the latch 13.

Figure 4B:
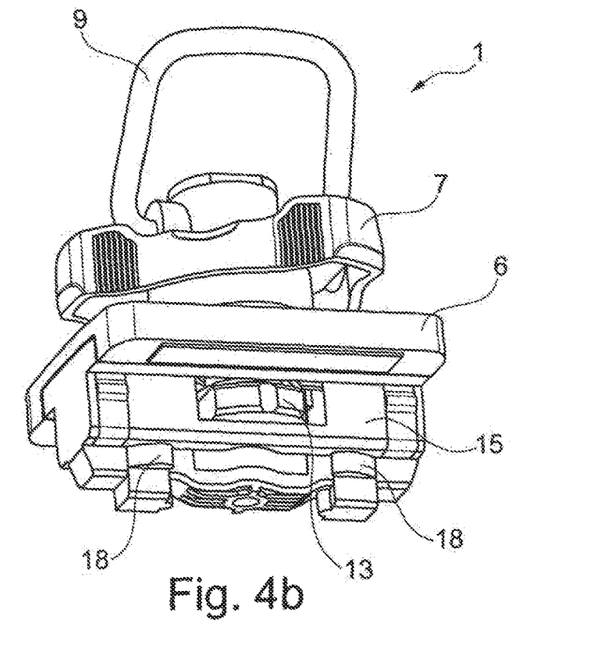

Once the handle 7 has turned through a quarter-turn in the direction of arrow V, the latch 13 has turned through 90° under the rims 3 of the rail and it projects our from the slide 15, as shown in FIGS. 4b and 5c, transversely relative to the rail. Simultaneously, the indexing studs 18 project from under the slide 15.

The latch 13 is then clamped against the bottom faces of the rims 3 of the rail, while the studs 18 are engaged in the lobes 16 in the bottom of the rail.

The attachment device 1 is removed from the rail merely by turning the handle 7 through a quarter-turn in the direction opposite to arrow V, with the return spring 19 then acting on the bearing plate 6 to move it away from the latch 13.

Blocking means may be provided between the two cam portions 14A and 14B in order to block rotation of the first cam portion relative to the second cam portion at the end of the locking and/or unlocking stroke. For example, as shown in FIG. 5c, when the handle 7 is in the fully locked position, a projection 21 provided on the cam portion 14B engages in a notch 22 provided in the cam portion 14A, thereby blocking mutual turning between the cam portions 14A and 14B.

As shown in FIG. 3, the handle 7 and the ring 9 may be designed in such a manner as to enable the ring 9 to be folded down on the handle 7.

It should be understood that the ring 9 could also be a stamping in the handle 7 without going beyond the ambit of the invention.

Figure 6A:
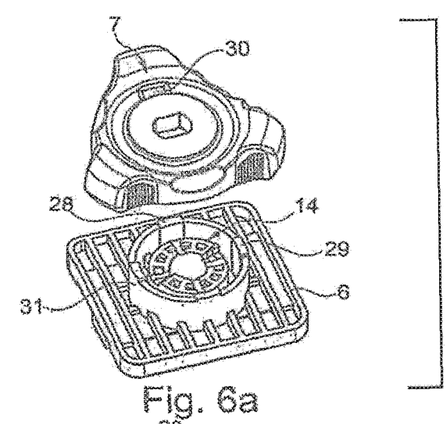
FIGS. 6a to 6c show an embodiment of a state indicator for the attachment device when in the locked and the unlocked positions.

FIG. 6a shows an embodiment of a state, indicator for the attachment device indicating it is in a fully locked position or in a fully unlocked position, i.e. when the latch is in its attachment position in the channel of the rail or when the latch is in its position for insertion into the channel of the rail.

In this example, the indicator is constituted by two different visible marks 28 and 29 that are angularly spaced apart from each other on a circularly arcuate path followed by a window 30 formed in the handle 7.

In this example, the two visible marks 28 and 29 are marks of different colors applied to the bearing place 6, being located in this example on a collar 31 projecting from the top of the bearing plate 6 and covered by the handle 7. In this example, the two marks are spaced apart from each other by 90° on the top peripheral edge of the collar 31.

By way of example, the mark 28 is a red mark and the mark 29 is a green mark.

The window 30 is arranged in the handle 7 to overlie the top peripheral edge of the collar 31 so as to come into alignment with the marks 28 and 29 when the handle 7 is turned.

Figure 6B:
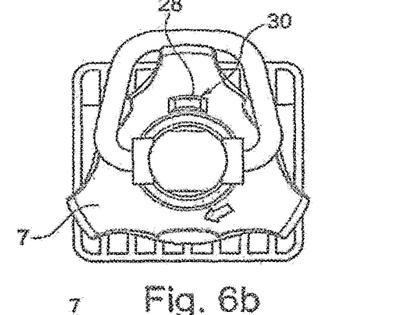

In FIG. 6b, the attachment device is shown in a fully locked state; the latch 13 is in its attachment position in the channel of the rail, as indicated, by the visible alignment of the red mark 28 as seen in the window 30 in the handle 7 (i.e. the bottom of the window 30 is completely red).

Figure 6C:
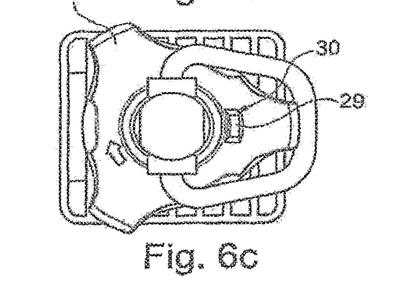

In FIG. 6c, the handle 7 has been turned through a quarter-turn in the unlocking direction from its position shown in FIG. 6b. The attachment device is now in a fully unlocked state. The latch 13 is in its position for insertion into the channel of the rail, as indicated by the green mark 29 being visibly in alignment with the window 30 in the handle 7 (the bottom of the window 30 is completely green).

It can be understood that with a modular attachment and stowage device of the invention, applying a continuous turning movement to the operating handle 7 causes the bearing plate to be pressed progressively against the rims of the rail, thereby obtaining well-controlled clamping without the attachment ring 9 necessarily being turned.

The invention claimed is:

1. An attachment device for attaching to a generally channel-section rail having rims forming a channel, the attachment device comprising:
   a latch for inserting into an inside of the channel and for being retained therein by the rims of the rail, and
   a locking member for locking the latch in the rail, wherein the locking member comprises a rotary shaft secured to the latch and extending axially through a bearing plate for resting on the top of the channel,
   the locking member comprises a cam adapted to move the bearing plate axially relative to the rotary shaft when the rotary shaft is turned in one direction or the other, and the bearing plate coming closer to the latch when the rotary shaft is turned in one direction of rotation and the bearing plate moving away from the latch when the rotary shaft is turned in the opposite direction;

a guide slide arranged under the bearing plate and designed to be inserted inside the channel, and at least one indexing stud that extends perpendicularly from the bearing plate in the guide slide, and wherein the cam is arranged in such a manner that when the shaft is turned in the first direction of rotation, the indexing stud projects from the guide slide, and when the shaft is turned in the opposite direction of rotation, the indexing stud is retracted into an inside of the guide slide.

2. The attachment device according to claim 1, wherein the latch is of elongate shape and is constrained to turn with the shaft so as to present an insertion position in which the latch extends along the rail, and an attachment position in which the latch extends transversely relative to the rail.

3. The attachment device according to claim 1, wherein the cam is made up of a first cam portion secured to the rotary shaft and a second cam portion secured to the bearing plate in which the rotary shaft can turn freely, the first cam portion being superposed on the second cam portion via a helical contact surface.

4. The attachment device according to claim 3, wherein the cam comprises blocking means for blocking movement of the first cam portion in rotation relative to the second cam portion at the end of the locking and/or unlocking stroke.

5. The attachment device according to claim 1, wherein the rail has a bottom defining indexing lobes in which the indexing stud becomes inserted.

6. The attachment device according to claim 1, further comprising a handle mounted at one end of the rotary shaft.

7. The attachment device according to claim 6, wherein the handle is surmounted by an attachment ring.

8. The attachment device according to claim 1, wherein the bearing plate comprises two flexible strips that enable the rail to be put under stress in controlled manner and that act as anti-vibration slack take-up means.

9. The attachment device according to claim 1, further comprising a state indicator for indicating the state of the attachment device in the fully locked position or in the fully unlocked position.

10. The attachment device according to claim 9, wherein said state indicator is constituted by two different visible marks arranged on the bearing plate and angularly spaced apart from each other on a circularly arcuate path of a window formed in the handle.

* * * * *